(12) United States Patent
Narita et al.

(10) Patent No.: US 11,590,578 B2
(45) Date of Patent: Feb. 28, 2023

(54) INTERNAL DEFECT DETECTION SYSTEM, THREE-DIMENSIONAL ADDITIVE MANUFACTURING DEVICE, INTERNAL DEFECT DETECTION METHOD, METHOD OF MANUFACTURING THREE-DIMENSIONAL ADDITIVE MANUFACTURED PRODUCT, AND THREE-DIMENSIONAL

(71) Applicant: MITSUBISHI HEAVY INDUSTRIES, LTD., Tokyo (JP)

(72) Inventors: Ryuichi Narita, Tokyo (JP); Toshiya Watanabe, Tokyo (JP); Akio Kondou, Tokyo (JP); Masashi Kitamura, Tokyo (JP); Hidetaka Haraguchi, Tokyo (JP); Shuji Tanigawa, Tokyo (JP); Claus Thomy, Bremen (DE); Henry Koehler, Bremen (DE)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 506 days.

(21) Appl. No.: 16/613,543

(22) PCT Filed: Aug. 8, 2017

(86) PCT No.: PCT/JP2017/028844
§ 371 (c)(1),
(2) Date: Nov. 14, 2019

(87) PCT Pub. No.: WO2019/030838
PCT Pub. Date: Feb. 14, 2019

(65) Prior Publication Data
US 2021/0162508 A1 Jun. 3, 2021

(51) Int. Cl.
*B22F 12/90* (2021.01)
*B33Y 10/00* (2015.01)
(Continued)

(52) U.S. Cl.
CPC .............. *B22F 12/90* (2021.01); *B22F 10/28* (2021.01); *B22F 10/36* (2021.01); *B33Y 10/00* (2014.12);
(Continued)

(58) Field of Classification Search
None
See application file for complete search history.

(56) References Cited

U.S. PATENT DOCUMENTS 6,054,192 A   4/2000 Otsuka et al.
8,878,094 B2  11/2014 Bagavath-Singh
(Continued)

FOREIGN PATENT DOCUMENTS

JP   10-211658   8/1998
JP   11-347761   12/1999
(Continued)

OTHER PUBLICATIONS

International Search Report dated Oct. 3, 2017 in International (PCT) Patent Application No. PCT/JP2017/028844, with English Translation.
(Continued)

*Primary Examiner* — Mohammad Ali
*Assistant Examiner* — Saad M Kabir
(74) *Attorney, Agent, or Firm* — Wenderoth, Lind & Ponack, L.L.P.

(57) ABSTRACT

An internal defect detection system for a three-dimensional additive manufacturing device which performs additive molding by emitting a laser beam to a powder bed is provided. This system specifies a candidate position of an internal defect on the basis of a change amount of a local temperature measured in an irradiated part of a powder bed irradiated by a laser beam. The system calculates a cooling speed at the candidate position on the basis of a temperature distribution and determines whether an internal defect exists on the basis of the cooling speed.

6 Claims, 8 Drawing Sheets

(51) Int. Cl.
*B33Y 30/00* (2015.01)
*B33Y 50/02* (2015.01)
*B22F 10/36* (2021.01)
*B22F 10/28* (2021.01)
*G01N 25/18* (2006.01)
*G01N 25/72* (2006.01)

(52) U.S. Cl.
CPC ............... *B33Y 30/00* (2014.12); *B33Y 50/02* (2014.12); *G01N 25/18* (2013.01); *G01N 25/72* (2013.01)

(56) References Cited

U.S. PATENT DOCUMENTS

| | | |
|---|---|---|
| 2004/0026807 A1 | 2/2004 | Andersson et al. |
| 2007/0196561 A1 | 8/2007 | Philippi et al. |
| 2015/0183158 A1 | 7/2015 | Schwarze et al. |
| 2017/0144248 A1 | 5/2017 | Yoshimura et al. |
| 2017/0239892 A1* | 8/2017 | Buller ................... B22F 10/40 |
| 2017/0292922 A1* | 10/2017 | Woods ................ G01N 23/046 |
| 2017/0334144 A1* | 11/2017 | Fish ...................... B29C 64/393 |

FOREIGN PATENT DOCUMENTS

| | | |
|---|---|---|
| JP | 2003-531034 | 10/2003 |
| JP | 2009-1900 | 1/2009 |
| JP | 2009-220576 | 10/2009 |
| JP | 4473124 | 6/2010 |
| JP | 2015-120342 | 7/2015 |
| JP | 2015-196265 | 11/2015 |

OTHER PUBLICATIONS

International Preliminary Report on Patentability dated Feb. 20, 2020 in corresponding International (PCT) Patent Application No. PCT/JP2017/028844, with English Translation.

* cited by examiner

INTERNAL DEFECT DETECTION SYSTEM, THREE-DIMENSIONAL ADDITIVE MANUFACTURING DEVICE, INTERNAL DEFECT DETECTION METHOD, METHOD OF MANUFACTURING THREE-DIMENSIONAL ADDITIVE MANUFACTURED PRODUCT, AND THREE-DIMENSIONAL

TECHNICAL FIELD

The present disclosure relates to an internal defect detection system for a three-dimensional additive manufacturing device which performs additive molding by emitting a beam such as a light beam or an electron beam to laid powder, a three-dimensional additive manufacturing device including the system, an internal defect detection method performed by the system, a method of manufacturing a three-dimensional additive manufactured product using the internal defect detection method, and a three-dimensional additive manufactured product manufactured according to the manufacturing method.

BACKGROUND

A three-dimensional additive molding technology for manufacturing a three-dimensional object by emitting a beam such as a light beam or an electron beam to powder laid in a layered form to perform additive molding is known. Patent Document 1 discloses an example of a technology of this type and discloses that a light beam is emitted to a powder layer formed of powder to form a sintered layer and this process is repeatedly performed to form a plurality of sintered layers stacked integrally whereby a three-dimensional object is manufactured.

CITATION LIST

Patent Literature

Patent Document 1: JP2009-001900A

SUMMARY

Technical Problem

In such a three-dimensional additive molding method as disclosed in Patent Document 1, since a large three-dimensional object is formed by repeatedly stacking a layered sintered layer, a long operation time is required until a final three-dimensional object is obtained. Particularly, when metallic powder such as iron, copper, aluminum, or titanium is used, the operation time may actually amounts to several tens of hours.

In a three-dimensional additive molding of this type, conventionally, since a technology of inspecting a forming defect in the middle of the progress of a forming work does not exist, the quality is evaluated by performing defect inspection after a series of forming works are completed. Particularly, since an internal defect existing in a manufactured three-dimensional object cannot be determined from an external appearance, the internal defect is detected by nondestructive inspection. When an internal defect is found by inspection after a forming work is performed, the three-dimensional object has to be discarded as a defective product, and a long operation time required thereuntil is a waste of time. This is a hindrance to improving the productively of a three-dimensional additive molding method.

At least one embodiment of the present invention has been made in view of the above-described problems, and an object thereof is to provide an internal defect detection system capable of detecting an internal defect on a real-time basis during a forming work and to provide a three-dimensional additive manufacturing device including the same and an internal defect detection method. Another object thereof is to provide a method for manufacturing a three-dimensional additive manufactured product having a satisfactory quality using the internal defect detection method and a three-dimensional additive manufactured product manufactured according to the manufacturing method.

Solution to Problem (1) In order to solve the above-described problems, an internal defect detection system for a three-dimensional additive manufacturing device according to at least one embodiment of the present invention is an internal defect detection system for a three-dimensional additive manufacturing device which performs additive molding by emitting a beam to a powder bed, the internal defect detection system including: a local-temperature detection sensor for measuring a local temperature of an irradiated part of the powder bed irradiated by the beam; a temperature-distribution detection sensor for detecting a temperature distribution of a detection-target area on the powder bed, the detection-target area including the irradiated part; a candidate-position specification part configured to specify a candidate position of an internal defect inside the detection-target area on the basis of a change amount of the local temperature detected by the local-temperature detection sensor with respect to a position within a surface of the powder bed; a cooling-speed calculation part configured to calculate a cooling speed at the candidate position from the temperature distribution detected by the temperature-distribution detection sensor; and a defect determination part configured to determine whether the internal defect exists at the candidate position on the basis of the cooling speed at the candidate position.

According to the configuration of (1), the local temperature of the irradiated part on the powder bed irradiated by the beam is measured by the local temperature detection sensor. The candidate-position specification part calculates the change amount of the measurement result obtained by the local temperature detection sensor with respect to the position within the surface of the powder bed and specifies the candidate position of the internal defect in the detection-target area on the basis of the change amount. On the other hand, the temperature-distribution detection sensor detects the temperature distribution of the detection-target area including the irradiated part. The cooling-speed calculation part calculates the cooling speed at the candidate position specified by the candidate-position specification part on the basis of the measurement result obtained by the temperature-distribution detection sensor. The defect determination part determines whether an internal defect exists at the candidate position on the basis of the cooling speed calculated by the cooling-speed calculation part.

In this configuration, first, the candidate position where an internal defect is likely to be present is specified on the basis of the local temperature in the irradiated part of the beam. The presence of an internal defect at the candidate position is determined further on the basis of the cooling speed in the temperature distribution in the detection-target area including the irradiated part. In this way, by making determination on the basis of a plurality of perspectives (a local temperature and a temperature distribution), it is possible to detect an internal defect from a wide range on the powder bed with high efficiency and high accuracy. Moreover, since such inspection can be performed on a real-time basis during a forming work of emitting a beam to the powder bed, when an internal defect is detected, appropriate countermeasures can be taken such as suspending or stopping the forming work at an early stage and wasting of an unnecessary subsequent operation time can be obviated. As a result, as compared to a case in which inspection is performed after a final molded object is obtained as in the conventional technology, it is possible to obviate wasting of an unnecessary operation time and to obtain satisfactory production efficiency.

(2) In some embodiments, in the configuration of (1), the candidate-position specification part is configured to specify a position where the change amount is greater than a surrounding part as the candidate position.

According to the configuration of (2), since a heat insulation effect increases due to the influence of a cavity present under a forming surface at a position where an internal defect exists under a beam emission position, the local temperature increases at a position irradiated by a beam, and the candidate position of the internal defect is specified on the basis of the change amount of the local temperature. For example, when the local temperature in a molten pool formed by emission of a beam while scanning on a forming surface is measured continuously, a temperature difference from an adjacent position where no defect exists increases due to a difference in a heat insulation effect if a defect exists under the molten pool.

As described above, since it is highly likely that an internal defect exists at a position where the change amount of the local temperature is greater than a surrounding part, the position is specified as the candidate position of the internal defect. In this way, it is possible to efficiently narrow down the candidate position where an internal defect is likely to be present from a wide detection-target area.

Although the defect determination part determines the presence of an internal defect at the candidate position on the basis of the cooling speed, since the heat insulation effect increases due to the influence of a cavity present under a beam emission position at a position where an internal defect exists, the cooling speed changes also. Therefore, when the cooling speed at a position where an internal defect exists is compared with the cooling speed at an adjacent position, the change in the cooling speed at the position where an internal defect exists is greater than that at a surrounding position where an internal defect does not exist. The defect determination part determines the presence of an internal defect at the candidate position on the basis of change in the cooling speed.

(3) In some embodiments, in the configuration of (1) or (2), the local-temperature detection sensor includes a radiation thermometer configured to measure the local temperature of the irradiated part of the beam on the basis of a strength of electromagnetic waves derived from the irradiated part through a light axis of the beam.

According to the configuration of (3), the local temperature detection sensor measures the local temperature on the basis of electromagnetic waves (for example, a reflection light from the irradiated part of a beam) derived from the irradiated part through the light axis of the beam. In this way, the local temperature detection sensor can measure the temperature at a local position with high accuracy by detecting the temperature on the basis of the electromagnetic waves from the irradiated part irradiated by the beam. Moreover, although the laser beam is scanned at a high speed on the powder bed according to a forming pattern, a good following ability with respect to such high-speed scanning is obtained.

(4) In some embodiments, in the configuration of any one of (1) to (3), the candidate-position specification part is configured to specify the candidate position on the basis of a result excluding an influence of an output change of the beam from the change amount.

According to the configuration of (4), since the candidate position is specified on the basis of a result obtained by excluding the influence of an output change of the beam itself, it is possible to evaluate the change amount resulting from an internal defect accurately and to detect the internal defect with high accuracy.

(5) In some embodiments, in the configuration of any one of (1) to (4), the system further includes a warning part for warning existence of the internal defect if the defect determination part determines that the internal defect exists.

According to the configuration of (5), when it is determined that an internal defect exists, a warning indicating the presence of an internal defect is issued whereby it is possible to take appropriate countermeasures such as suspending and stopping a forming work.

The warning issued by the warning part may prompt countermeasures in such a manner that can be sensed by the five senses of a person such as an operator and may instruct a three-dimensional additive manufacturing device performing a forming work to perform automated control in an electrical or mechanical manner.

(6) In some embodiments, in the configuration of any one of (1) to (5), the defect determination part is configured to determine whether the internal defect exists, a predetermined number of cycles after a cycle in which the beam is emitted, in accordance with an input heat amount of the beam.

According to the configuration of (6), the presence of an internal defect formed according to the melt-in depth is determined after a predetermined number of cycles from a cycle in which the powder bed is laid according to the input heat amount of the beam radiated to the powder bed. In this way, it is possible to detect an internal defect existing on the lower layer side than the newly laid powder bed accurately.

(7) In order to solve the above-described problems, a three-dimensional additive manufacturing device according to at least one embodiment of the present invention is a three-dimensional additive manufacturing device, including: a base plate; a beam emitting unit for emitting a beam to a powder bed formed on the base plate to selectively harden the powder bed; and the internal defect detection system according to any one of (1) to (6) configured to detect an internal defect in a forming layer formed by the beam emitting unit.

According to the configuration of (7), since the three-dimensional additive manufacturing device includes the internal defect detection system (including various aspects described above), when an internal defect is detected during a forming work, appropriate countermeasures can be taken such as suspending or stopping the forming work and wasting of an unnecessary subsequent operation time can be obviated. As a result, as compared to a case in which inspection is performed after a final molded object is obtained as in the conventional technology, it is possible to obviate wasting of an unnecessary operation time and to obtain satisfactory production efficiency.

(8) In order to solve the above-described problems, an internal defect detection method according to at least one embodiment of the present invention is a method of detecting an internal defect of a three-dimensional additive manufacturing device which performs additive molding by emitting a beam to a powder bed, the method including: measuring a local temperature of an irradiated part of the powder bed irradiated by the beam; detecting a temperature distribution of a detection-target area on the powder bed, the detection-target area including the irradiated part; specifying a candidate position of an internal defect inside the detection-target area on the basis of a change amount of the local temperature with respect to a position within a surface of the powder bed; calculating a cooling speed at the candidate position from the temperature distribution; and determining whether the internal defect exists at the candidate position on the basis of the cooling speed at the candidate position.

The method of (8) can be appropriately performed by the above-described internal defect detection system (including various aspects described above).

(9) In order to solve the above-described problems, a method of manufacturing a three-dimensional additive manufactured product according to at least one embodiment of the present invention is a method of manufacturing a three-dimensional additive manufactured product for emitting a beam to powder laid in a layered form to perform additive molding, the method including: laying the powder on a base plate to form a powder bed; emitting the beam to the powder bed to selectively harden the powder bed; measuring a local temperature of an irradiated part of the powder bed irradiated by the beam; detecting a temperature distribution of a detection-target area on the powder bed, the detection-target area including the irradiated part; specifying a candidate position of an internal defect in the detection-target area on the basis of a change amount of the local temperature with respect to a position within a surface of the powder bed; calculating a cooling speed at the candidate position from the temperature distribution; determining whether an internal defect exists at the candidate position on the basis of the cooling speed at the candidate position; and performing a recovery operation for the internal defect when it is determined that the internal defect exists.

According to the manufacturing method of (9), it is possible to manufacture a high-quality three-dimensional additive manufactured product with a few internal defects.

(10) In order to solve the above-described problems, a three-dimensional additive manufactured product according to at least one embodiment of the present invention is a three-dimensional additive manufactured product manufactured by performing additive molding by emitting a beam to powder laid in a layered form, the manufacturing involving: laying the powder on a base plate to form a powder bed; emitting the beam to the powder bed to selectively harden the powder bed; measuring a local temperature of an irradiated part of the powder bed irradiated by the beam; detecting a temperature distribution of a detection-target area on the powder bed, the detection-target area including the irradiated part; specifying a candidate position of an internal defect in the detection-target area on the basis of a change amount of the local temperature with respect to a position within a surface of the powder bed; calculating a cooling speed at the candidate position from the temperature distribution; determining whether an internal defect exists at the candidate position on the basis of the cooling speed at the candidate position; and performing a recovery operation for the internal defect when it is determined that the internal defect exists.

The three-dimensional additive manufactured product of (10) has a few internal defects and high quality.

Advantageous Effects

According to at least one embodiment of the present invention, it is possible to provide an internal defect detection system capable of detecting an internal defect on a real-time basis during a forming work and to provide a three-dimensional additive manufacturing device including the same and an internal defect detection method.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

Furthermore, for example, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
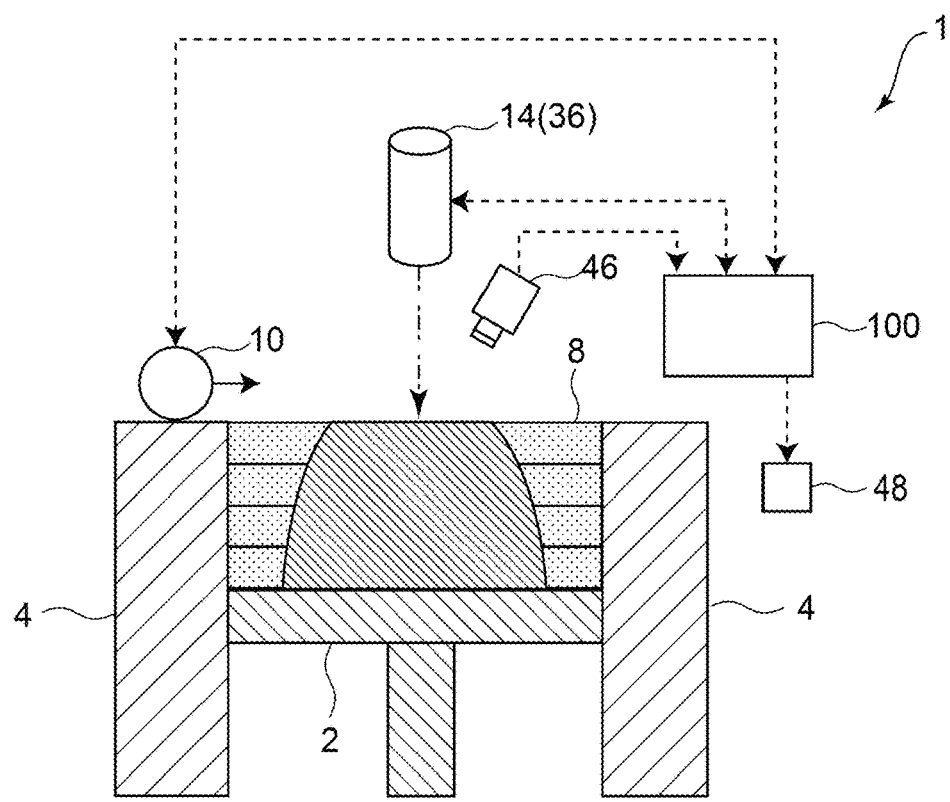
FIG. 1 is a schematic diagram illustrating an entire configuration of a three-dimensional additive manufacturing device according to at least one embodiment of the present invention.

FIG. 1 is a schematic diagram illustrating an entire configuration of a three-dimensional additive manufacturing device 1 according to at least one embodiment of the present invention.

The three-dimensional additive manufacturing device 1 is a device for manufacturing a three-dimensional object by performing additive molding by emitting a beam to powder laid in a layered form. The three-dimensional additive manufacturing device 1 includes a base plate 2 serving as a base on which a three-dimensional object is formed. The base plate 2 is disposed so as to move up and down on an inner side of a cylinder 4 having an approximately cylindrical shape and having a central axis along a vertical direction. Powder is laid on the base plate 2 (which will be described later) whereby a powder bed 8 is formed thereon. A new powder bed 8 is formed when powder is laid on an upper layer side of the base plate 2 whenever the base plate 2 moves down in each cycle during a forming work.

Although a case in which a light beam is radiated as a beam is illustrated in the three-dimensional additive manufacturing device 1 of the present embodiment, the idea of the present invention can be similarly applied to when a beam of another form such as an electron beam is used.

The three-dimensional additive manufacturing device 1 includes a powder laying unit 10 for laying powder on the base plate 2 to form the powder bed 8. The powder laying unit 10 forms the layered powder bed 8 having an approximately uniform thickness over an entire upper surface of the base plate 2 by supplying powder to an upper surface side of the base plate 2 and planarizing the surface thereof. The powder bed 8 formed in each cycle is selectively hardened by being irradiated by a beam from a beam emitting unit 14 (to be described later). In a subsequent cycle, powder is laid on an upper layer side thereof again by the powder laying unit 10 whereby a new powder bed is formed and the powder beds are stacked in a layered form.

The powdered material supplied from the powder laying unit 10 is a powdered material serving as a raw material of a three-dimensional object, and for example, a wide variety of metallic materials such as iron, copper, aluminum, or titanium and a wide variety of non-metallic materials such as ceramics can be employed.

Figure 2:
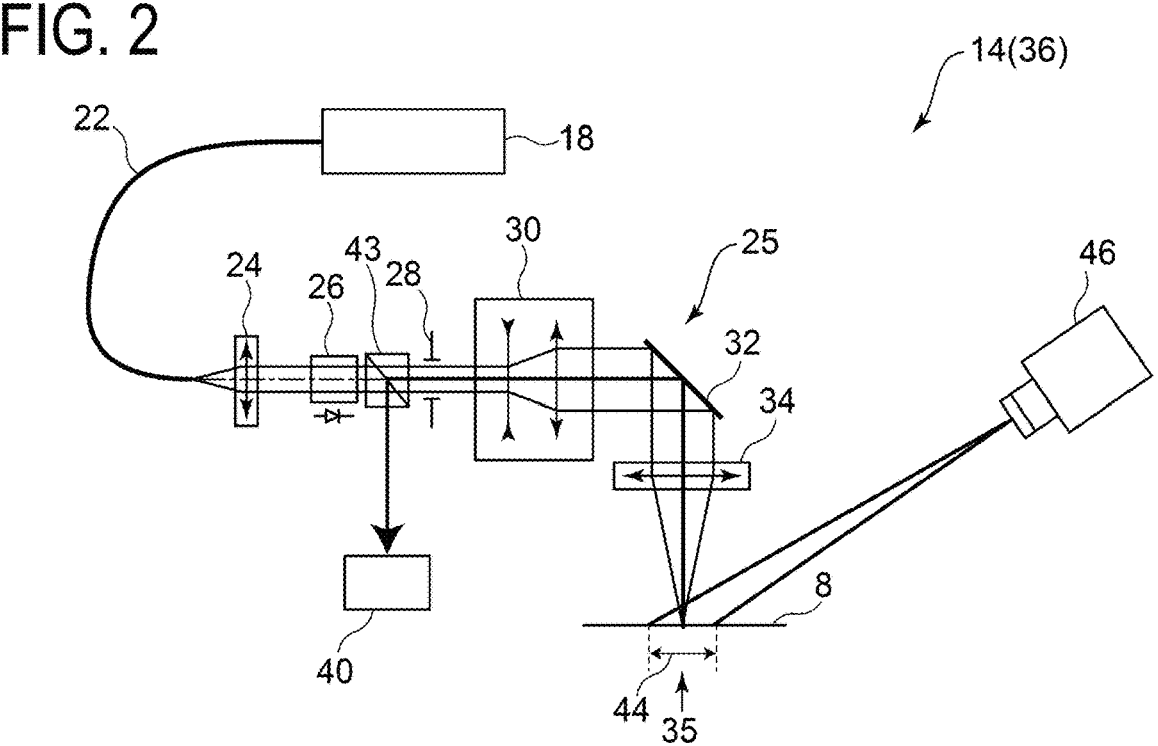
FIG. 2 is a schematic diagram illustrating an internal configuration of a beam emitting unit illustrated in FIG. 1.

The three-dimensional additive manufacturing device 1 includes the beam emitting unit 14 for emitting a beam to the powder bed 8 so that the powder bed 8 is selectively hardened. Here, FIG. 2 is a schematic diagram illustrating an internal configuration of the beam emitting unit 14 illustrated in FIG. 1. The beam emitting unit 14 includes a light source 18 that outputs a laser beam as a beam, an optical fiber 22 for guiding the beam from the light source 18 to a light condensing portion 25, and the light condensing portion 25 including a plurality of optical members.

In the light condensing portion 25, the beam guided by the optical fiber 22 is incident on a collimator 24. The collimator 24 collimates the beam to parallel light. The light output from the collimator 24 is incident on a beam expander 30 via an isolator 26 and a pinhole 28. After the diameter of the beam is expanded by the beam expander 30, the beam is deflected by a galvano mirror 32 that can swing in an arbitrary direction and is radiated to the powder bed 8 via an fθ lens 34.

The beam radiated from the beam emitting unit 14 is scanned two-dimensionally along a surface of the powder bed 8. Such two-dimensional scanning of beam is performed in a pattern corresponding to a three-dimensional object serving as a forming target. For example, the scanning may be performed when the beam emitting unit 14 moves along the surface of the base plate 2 with the aid of a driving mechanism (not illustrated), may be performed when the angle of the galvano mirror 32 is controlled, or may be performed by a combination thereof.

In the three-dimensional additive manufacturing device 1 having such a configuration, the powder is laid on the base plate 2 by the powder laying unit 10 in each cycle to form the powder bed 8, and the beam from the beam emitting unit 14 is scanned two-dimensionally while being radiated to the powder bed 8 whereby the powder included in the powder bed 8 is selectively hardened. In a forming work, such a cycle is performed repeatedly whereby hardened forming layers are stacked and a target three-dimensional object is manufactured.

The three-dimensional additive manufacturing device 1 includes a local temperature detection sensor 36 for measuring a local temperature of an irradiated part 35 of the powder bed 8 irradiated by the beam. In the present embodiment, the local temperature detection sensor 36 is configured to be integrated with the beam emitting unit 14. Specifically, as illustrated in FIG. 2, the local temperature detection sensor 36 is a radiation thermometer configured to measure a local temperature of the irradiated part 35 of the beam on the basis of a strength of electromagnetic waves (reflection light of the beam radiated to the powder bed 8) derived from the irradiated part 35 through a light axis of the beam and is configured to include a pyrometer 40. The pyrometer 40 detects heat radiation of a portion of the reflection light extracted by the dichroic mirror 43 disposed between the isolator 26 and the pinhole 28 and measures a local temperature on the basis of the Stefan-Boltzmann's law. The measurement result obtained by the local temperature detection sensor 36 is transmitted to a control device 100 to be described later as electrical signals and is used for various processes.

In this way, the local temperature detection sensor 36 can measure a local temperature with satisfactory accuracy since the local temperature is measured on the basis of the reflection light of the beam derived from the irradiated part 35 in which the beam is radiated at a pinpoint. Moreover, since the local temperature detection sensor 36 is configured to be integrated with the beam emitting unit 14 and performs temperature measurement on the basis of reflection waves propagating through the same path as the beam radiated to the powder bed 8, a good following ability with respect to the beam being scanned at a high speed is obtained.

The three-dimensional additive manufacturing device 1 is provided with a temperature-distribution detection sensor 46 for detecting a temperature distribution of a detection-target area 44 in the powder bed 8 including the irradiated part 35. Here, the detection-target area 44 is an area having a larger size than at least the irradiated part 35 irradiated by the beam, and the temperature-distribution detection sensor 46 is configured to be able to detect a two-dimensional temperature distribution in the area.

Such a temperature-distribution detection sensor 46 is configured as a two-color thermometer (Pyrocamera) or an infrared camera of which the measurement range is the detection-target area 44, for example, and is provided on the ceiling or the wall surface of a forming area so as to face the detection-target area 44 on the powder bed 8, for example.

Moreover, the temperature-distribution detection sensor 46 may be driven so that the detection-target area 44 moves so as to follow the beam being scanned two-dimensionally. For example, the temperature-distribution detection sensor 46 may be follow-up controlled so that the irradiated part 35 is always positioned at the center of the detection-target area 44. The measurement result obtained by the temperature-distribution detection sensor 46 is transmitted to the control device 100 (to be described later) as electrical signals and is used for various processes similarly to the local temperature detection sensor 36 described above.

The three-dimensional additive manufacturing device 1 includes a warning part 48 for allowing an operator or an external device to recognize occurrence of abnormalities. When a recognition target is a person such as an operator, the warning part 48 is configured as a buzzer or an indicator for warning occurrence of abnormalities, for example, in such a manner that abnormalities can be recognized by the five senses such as visual or auditory senses. When a recognition target is an external device, the warning part 48 is configured to transmit electrical signals that can be recognized by the external device, and predetermined countermeasure operations are performed automatically when the external device receives the electrical signals.

The control device 100 is a control unit of the three-dimensional additive manufacturing device 1 and is configured, for example, as an electronic arithmetic device such as a computer. Typically, the control device 100 is configured to include an input device capable of inputting various pieces of information, a storage device capable of storing various pieces of information, an arithmetic device capable of computing various pieces of information, and an output device capable of outputting various pieces of information. However, existing examples of general configuration of these electronic arithmetic devices may be employed, and detailed description thereof will be omitted. Such a control device 100 is configured to perform an internal defect detection method according to at least one embodiment of the present invention by operating according to a program stored in a storage device in advance.

Figure 3:
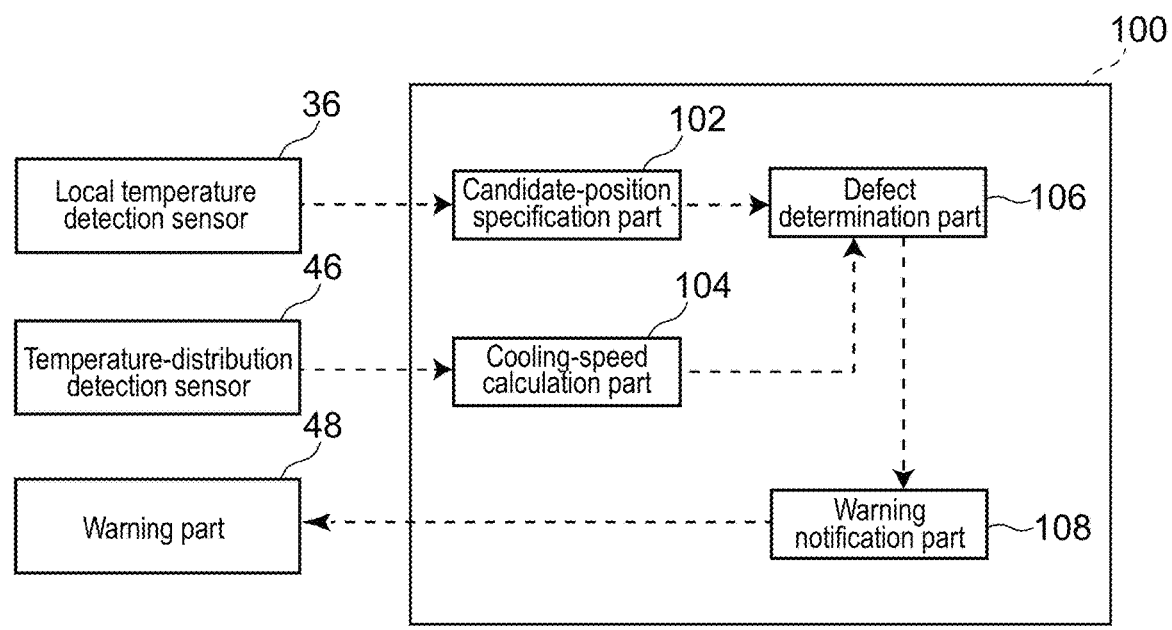
FIG. 3 is a block diagram functionally illustrating an internal configuration of a control device illustrated in FIG. 1.

FIG. 3 is a block diagram functionally illustrating an internal configuration of the control device 100 illustrated in FIG. 1. FIG. 3 illustrates representative components related to the details of control to be described later among the functional components of the control device 100 and another component may be included as necessary.

The control device 100 includes a candidate-position specification part 102 that specifies a candidate position of an internal defect on the basis of a change amount of the local temperature detected by the local temperature detection sensor 36 with respect to a position within the surface of the powder bed 8, a cooling-speed calculation part 104 that calculates a cooling speed at the candidate position from the temperature distribution detected by the temperature-distribution detection sensor 46, a defect determination part 106 that determines whether an internal defect exists at the candidate position on the basis of the cooling speed at the candidate position, and a warning notification part 108 for warning the presence of an internal defect when the defect determination part 106 determines that the internal defect exists.

The candidate-position specification part 102 specifies the candidate position of an internal defect on the basis of a change amount of the local temperature detected by the local temperature detection sensor 36 with respect to a position within the surface of the powder bed 8. The beam emitting unit 14 scans a beam on the powder bed 8 two-dimensionally according to a pattern set depending on a molded object to be formed by the three-dimensional additive manufacturing device 1. Here, as described above with reference to FIG. 2, since the local temperature detection sensor 36 is configured to be integrated with the beam emitting unit 14, the local temperature of the irradiated part 35 irradiated by the beam is measured sequentially on a real-time basis together with scanning of the beam.

Figure 4:
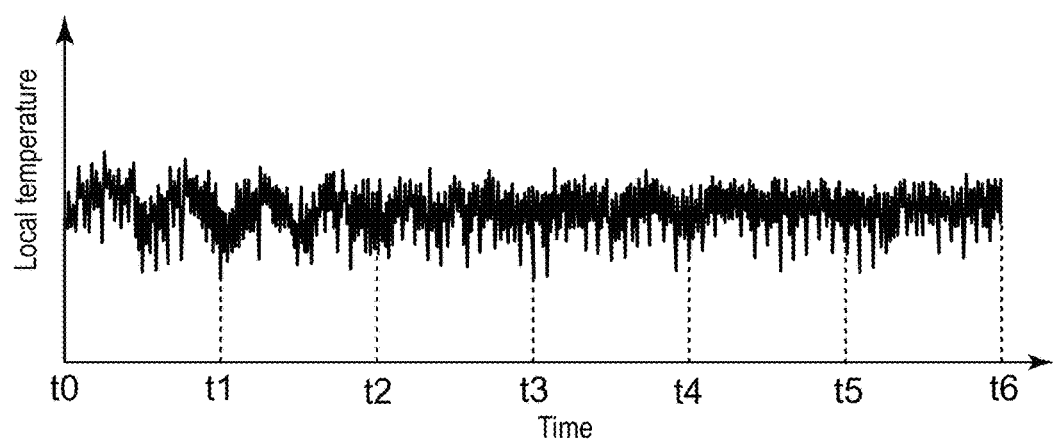
FIG. 4 is an example of a measurement result obtained by a local temperature detection sensor.
Figure 5:
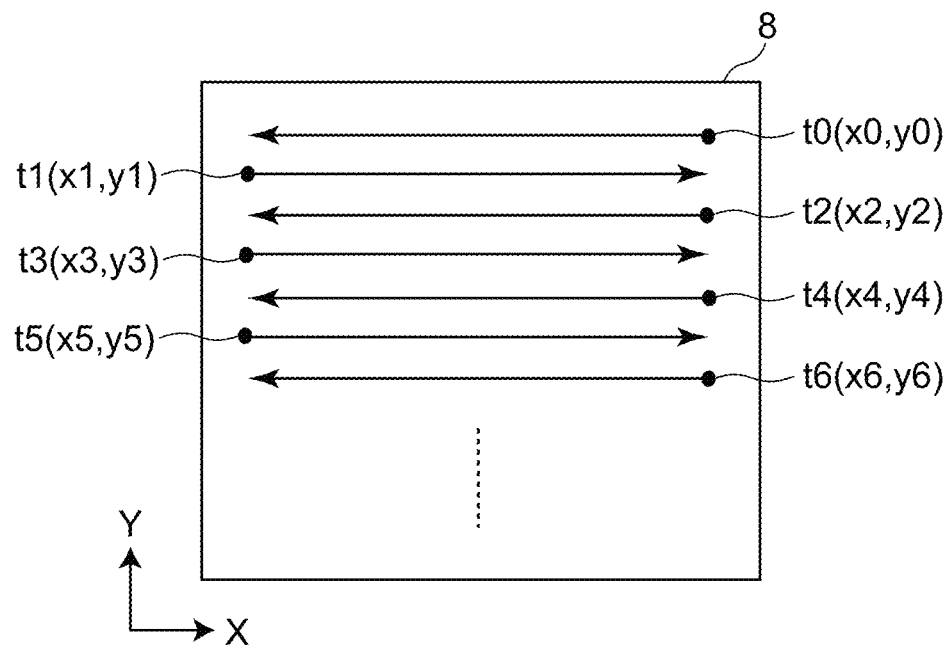
FIG. 5 is a schematic diagram illustrating a concept of converting a temporal change in local temperature measured by a local temperature detection sensor to a position coordinate.
Figure 6:
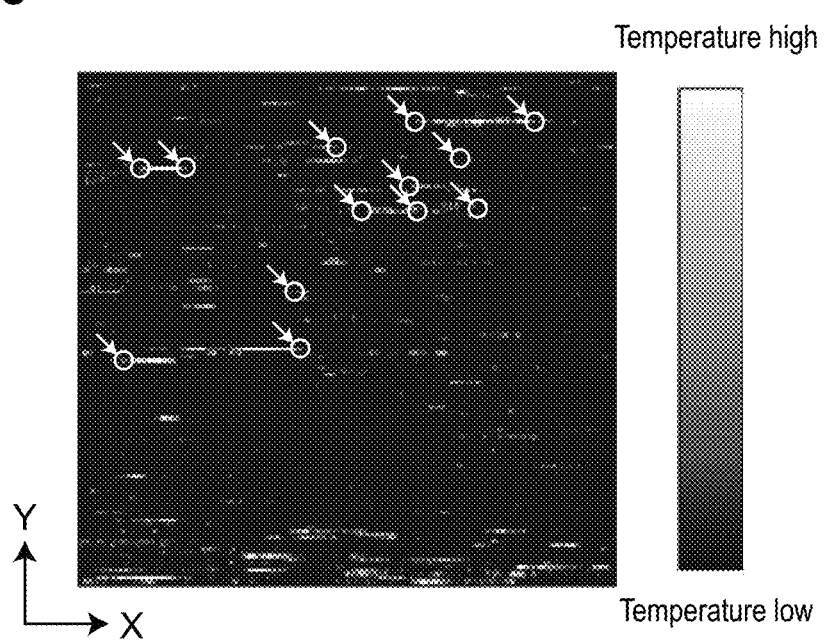
FIG. 6 is a mapping example of a local temperature obtained on the basis of the measurement result illustrated in FIG. 4.

Here, FIG. 4 is an example of the measurement result obtained by the local temperature detection sensor 36, FIG. 5 is a schematic diagram illustrating the concept of converting a temporal change in the local temperature measured by the local temperature detection sensor 36 to a position coordinate, and FIG. 6 is a mapping example of the local temperature obtained on the basis of the measurement result illustrated in FIG. 4.

As illustrated in FIG. 4, the measurement value obtained by the local temperature detection sensor 36 is acquired as a temporal change in the local temperature in the irradiated part 35. Although this example illustrates a temporal change in the local temperature measured in a period between time points t0 and t6, the irradiated part 35 moves along a beam scanning pattern in that period as illustrated in FIG. 5. FIG. 5 illustrates a state in which a beam is scanned on the powder bed 8 in a zigzag form so that the irradiated part 35 at a position (x0,y0) at time point t0 passes through a position (x1,y1) at time point t1, a position (x2,y2) at time point t2, a position (x3,y3) at time point t3, a position (x4,y4) at time point t4, a position (x5,y5) at time point t5, and a position (x6,y6) at time point t6.

As described above, the respective points included in the temporal change of the local temperature in FIG. 4 each indicate the local temperature corresponding to each point of a scanning path illustrated in FIG. 5. Therefore, by examining the relation between the time axis in FIG. 4 and the respective points (the positions within the surface of the powder bed 8) of the scanning path in FIG. 5 on the basis of the beam scanning pattern, a local temperature with respect to a time parameter in FIG. 4 can be converted to a local temperature with respect to a position parameter. In this manner, the mapping of the local temperature illustrated in FIG. 6 is obtained by converting the temporal change of the local temperature in FIG. 4 to the position within the surface.

In the candidate-position specification part 102, a candidate position of an internal defect is specified on the basis of such a mapping of the local temperature. In the present embodiment, in view of the fact that a heat insulation effect increases at a position where an internal defect exists, a position where a change amount of the local temperature with respect to the position within the surface of the powder bed 8 is greater than a surrounding part is specified as the candidate position. In FIG. 6, the higher the local temperature in a region, the closer to white whereas the lower the local temperature of a region, the closer to black. Therefore, a position having a large change amount like a position indicated by a white arrow, for example, is specified as the candidate position (since a number of candidate positions are present in FIG. 6, some representative candidate positions only are indicated by white arrows). That is, when the local temperature in a molten pool formed by emission of a beam while scanning on a forming surface is measured continuously, a temperature difference from an adjacent position where no defect exists increases due to a difference in a heat insulation effect if a defect exists under the molten pool. As described above, since it is highly likely that an internal defect exists at a position where the change amount of the local temperature is greater than a surrounding part, the position is specified as the candidate position of the internal defect.

Although an output level of the beam radiated from the beam emitting unit 14 may change in the course of being scanning as in FIG. 5, in such a case, the candidate position may be specified on the basis of a result obtained by excluding the influence of change in the output level from the change amount of the local temperature. In this way, it is possible to extract the influence of the presence of an internal defect only and to specify the candidate position with satisfactory accuracy.

Figure 7:
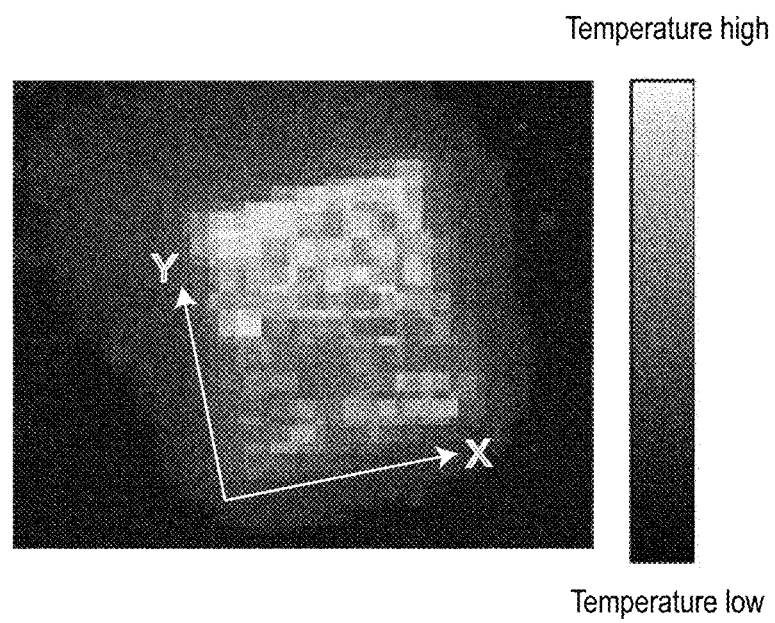
FIG. 7 is an example of a temperature distribution in a detection-target area detected by a temperature-distribution detection sensor.
Figure 8:
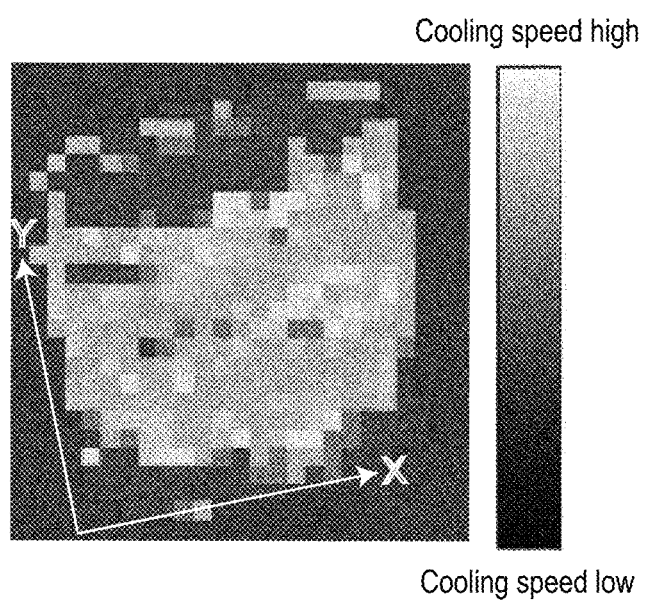
FIG. 8 is an example of a cooling speed distribution in a detection-target area calculated on the basis of the temperature distribution illustrated in FIG. 7.

The cooling-speed calculation part 104 acquires the temperature distribution obtained by the detection-target area 44 detected by the temperature-distribution detection sensor 46 and calculates a cooling speed at the candidate position on the basis of the temperature distribution. Here, FIG. 7 is an example of a temperature distribution of the detection-target area 44 detected by the temperature-distribution detection sensor 46. In FIG. 7, the higher the temperature of a region, the closer to white whereas the lower the temperature of a region, the closer to black. The cooling-speed calculation part 104 measures a temporal temperature change at each point and calculates the cooling speed by continuously acquiring such a temperature distribution over time of the detection-target area 44. FIG. 8 is an example of a cooling speed distribution in the detection-target area 44 calculated on the basis of the temperature distribution illustrated in FIG. 7, and the higher the cooling speed in a region, the closer to white whereas the lower the cooling speed in a region, the closer to black.

The defect determination part 106 determines whether an internal defect exists on the basis of the cooling speed calculated by the cooling-speed calculation part 104 with respect to each of the candidate positions specified by the candidate-position specification part 102. As described above, since the heat insulation effect increases due to the influence of a cavity present under a beam emission position at a position where an internal defect exists, the cooling speed changes also. Therefore, when the cooling speed at a position where an internal defect exists is compared with the cooling speed at an adjacent position, the change in the cooling speed at the position where an internal defect exists is greater than that at a surrounding position where an internal defect does not exist. In the present embodiment, in view of the fact that a heat insulation effect increases at a position where an internal defect exists, the defect determination part 106 sets a reference value of the cooling speed when an internal defect does not exist in advance and determines that an internal defect exists if the cooling speed calculated by the cooling-speed calculation part 104 is less than the reference value.

The warning notification part 108 activates the warning part 48 when the defect determination part 106 determines that an internal defect exists to warn the presence of an internal defect.

Figure 9:
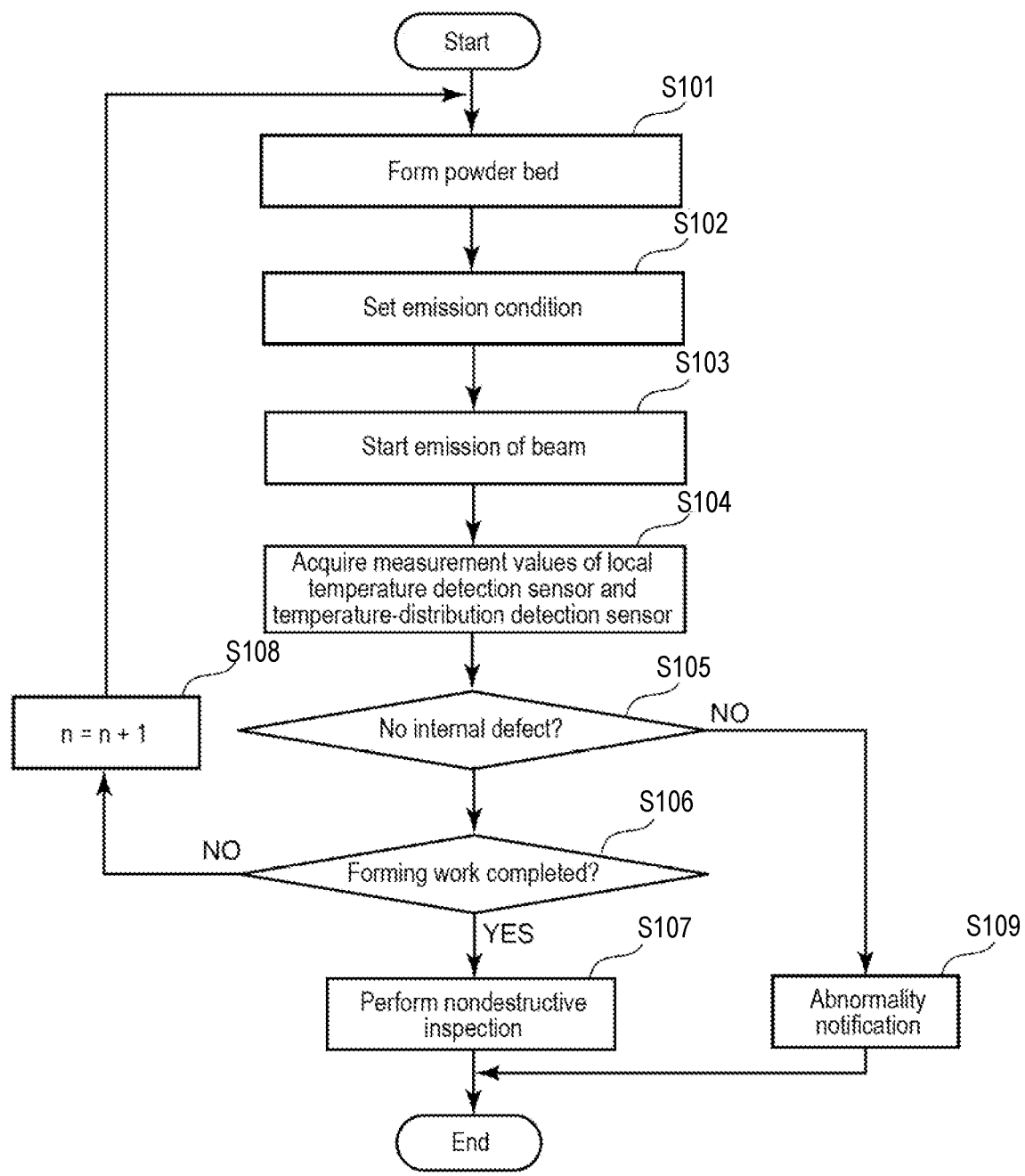
FIG. 9 is a flowchart illustrating the details of each step of the control of the three-dimensional additive manufacturing device illustrated in FIG. 1.

Next, the details of the control of the three-dimensional additive manufacturing device 1 having the above-described configuration will be described in detail. FIG. 9 is a flowchart illustrating the details of each step of the control of the three-dimensional additive manufacturing device 1 illustrated in FIG. 1. Although the three-dimensional additive manufacturing device 1 repeats a forming cycle to progress steps in order to form a three-dimensional object serving as a forming target, an n (an arbitrary natural number)-th forming cycle will be described as an example in the following description.

First, the three-dimensional additive manufacturing device 1 controls the powder laying unit 10 so that powder is laid on the base plate 2 or the powder bed 8 of an (n-1)th layer laid in advance on the base plate 2 to form the powder bed 8 of the n-th layer (step S101). Here, the thickness to of the powder bed 8 formed newly is several tens of μ, for example.

Subsequently, the three-dimensional additive manufacturing device 1 sets a emission condition corresponding to a three-dimensional object serving as a forming target (step S102) with respect to the powder bed 8 of the n-th layer formed in step S101 by controlling the beam emitting unit 14 and radiates a beam on the basis of the set emission condition to start a forming work (step S103).

The measurement values obtained by the local temperature detection sensor 36 and the temperature-distribution detection sensor 46 are acquired while a laser beam being scanned and radiated by the beam emitting unit 14 (step S104). The measurement values obtained by the local temperature detection sensor 36 and the temperature-distribution detection sensor 46 are received by the control device 100 as electrical signals.

Figure 10:
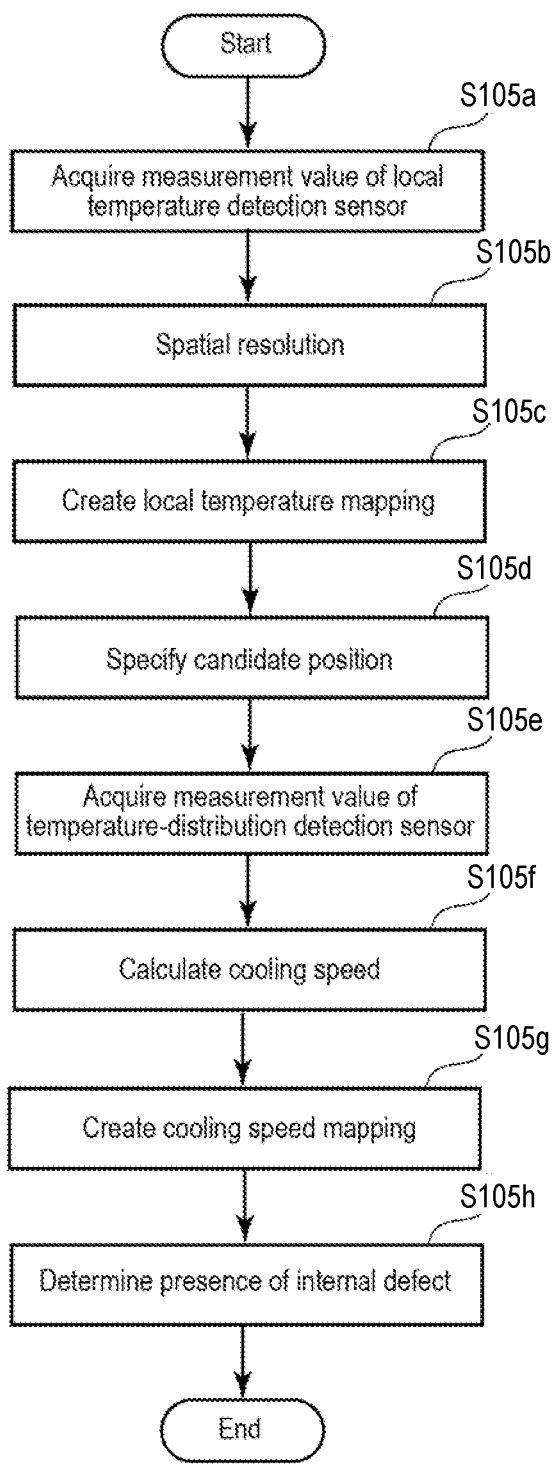
FIG. 10 is a flowchart illustrating each step of a subroutine of step S105 in FIG. 9.

Subsequently, in the control device 100, the presence of an internal defect is determined (step S105) on the basis of the measurement value received in step S104. As described above with reference to FIG. 3, the control device 100 includes the candidate-position specification part 102, the cooling-speed calculation part 104, the defect determination part 106, and the warning notification part 108. While the details of the control in the respective parts have been described above, a specific determination method in this step will be described in detail with reference to FIG. 10. FIG. 10 is a flowchart illustrating each step of a subroutine of step S105 in FIG. 9.

First, the candidate-position specification part 102 acquires the measurement value obtained by the local temperature detection sensor 36 (step S105a). Here, the measurement value acquired by the candidate-position specification part 102 is a temporal change of the local temperature as illustrated in FIG. 4. On the other hand, the candidate-position specification part 102 spatially resolves (converts to a position coordinate) the temporal change of the local temperature so as to correspond to the position within the surface (step S105b) by examining a beam emission pattern (see FIG. 5) on the powder bed 8 on the basis of the emission condition set in step S102. In this way, the mapping of the local temperature on the powder bed 8 as illustrated in FIG. 6 is created (step S105c). The candidate-position specification part 102 specifies a position at which the change amount of the local temperature is greater than a surrounding part as the candidate position (step S105d) as indicated by white arrows in FIG. 6.

Subsequently, the cooling-speed calculation part 104 acquires the measurement value obtained by the temperature-distribution detection sensor 46 (step S105e) at the candidate position specified in step S105d. Here, the measurement value acquired by the cooling-speed calculation part 104 is such a two-dimensional temperature distribution as illustrated in FIG. 7. The cooling-speed calculation part 104 calculates the cooling speed at the candidate position (step S105f) by continuously acquiring such a temperature distribution over time and creates the mapping of the cooling speed as illustrated in FIG. 8 (step S105g).

The defect determination part 106 determines whether an internal defect exists (step S105h) on the basis of the mapping of the cooling speed created in step S105g with respect to the candidate position specified in step S105d. In the present embodiment, in view of the fact that a heat insulation effect increases at a position where an internal defect exists, the defect determination part 106 sets a reference value of the cooling speed when an internal defect does not exist in advance and determines that an internal defect exists at the candidate position when the cooling speed at the candidate position calculated by the cooling-speed calculation part 104 is less than the reference value.

Returning to FIG. 9, when it is determined in such a determination process that an internal defect exists at the candidate position (step S105: YES), the warning notification part 108 warns the presence of an internal defect by activating the warning part 48 (step S109). In this way, a worker such as an operator can recognize the presence of an internal defect and an appropriate countermeasure can be taken such as suspending or stopping a subsequent forming work. For example, when it is determined that an internal defect exists, a forming work is suspended and a recovery operation for recovering an internal defect such as re-emission of a beam to a position where it is determined that an internal defect exists or re-laying of powder is performed. When such a recovery operation is completed, a suspended state of the forming work is released and additive molding is continued.

On the other hand, when it is determined that an internal defect does not exist (step S105: NO), the control device 100 determines whether the forming cycle has been repeated sufficiently and a series of forming works have been completed (step S106). When the forming work is not completed (step S106: NO), the control device 100 returns to step S101 and a forming work of the (n+1)th layer is performed (step S108). In this manner, the control device 100 monitors the presence of an internal defect on a real-time basis while a forming work is being repeated and a warning is issued at a time point when an internal defect is found.

After that, when the forming cycle is repeated sufficiently and the forming work is completed (step S106: YES), nondestructive inspection is performed on the obtained three-dimensional molded object as necessary (step S107). This nondestructive inspection is performed independently from the internal defect inspection and is performed to guarantee the quality more reliably and may be omitted as necessary. When it is confirmed by the nondestructive inspection that no defect exists in a final product, the series of forming works is completed (END).

Although it may not be possible to completely eliminate a possibility that a certain abnormality is found in the nondestructive inspection of step S107 in the present embodiment, since the inspection of an internal defect is performed on a real-time basis during the forming work as described above, it is possible to effectively decrease the possibility that an abnormality is found in the final nondestructive inspection.

<Modification>

Figure 11:
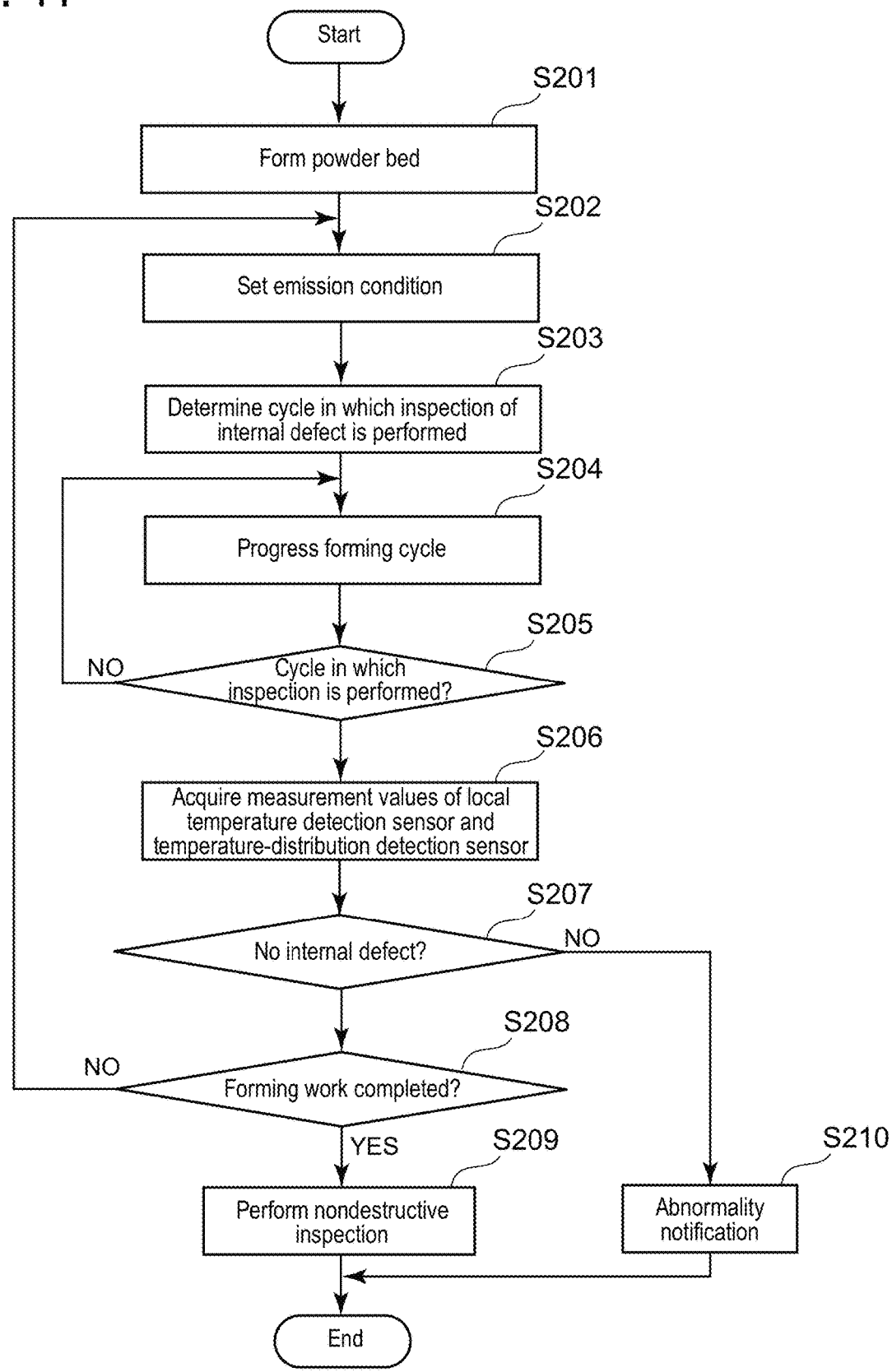
FIG. 11 is a flowchart illustrating a modification of FIG. 9.

Although a case in which the inspection of an internal defect is performed without variation in all cycles has been illustrated in the above-described embodiment, the internal defect inspection may be performed at an appropriate timing in each cycle as in the following modification. FIG. 11 is a flowchart illustrating a modification of FIG. 9.

In this modification, first, the three-dimensional additive manufacturing device 1 controls the powder laying unit 10 so that powder is laid on the base plate 2 or the powder bed 8 of an (n-1)th layer laid in advance on the base plate 2 to form the powder bed 8 of the n-th layer (step S201) similarly to step S101. The three-dimensional additive manufacturing device 1 sets an emission condition corresponding to a three-dimensional object serving as a forming target with respect to the formed powder bed 8 of the n-th layer by controlling the beam emitting unit 14 (step S202) similarly to step S102. The emission condition includes information (for example, information related to an input heat amount of the beam) necessary for evaluating a melt-in depth of the melt-in portion 8a formed when a beam is radiated to the powder bed 8 as will be described later.

Figure 12:
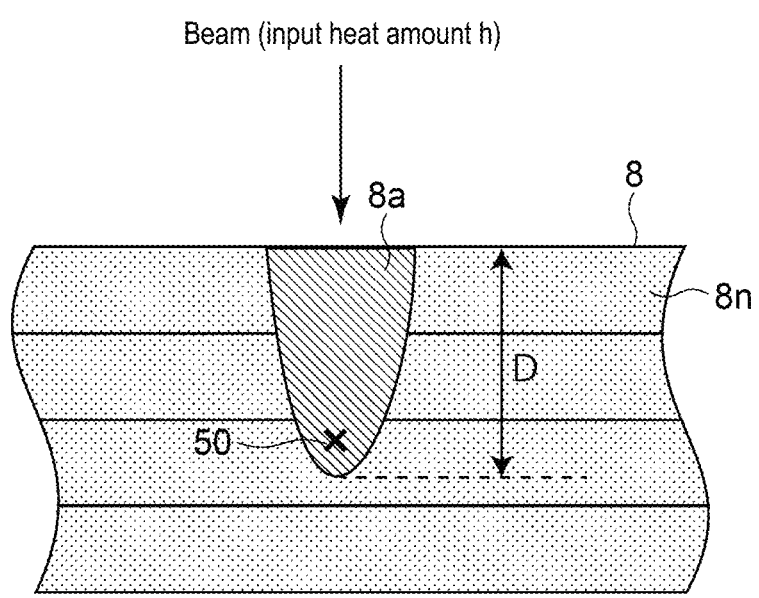
FIG. 12 is a schematic diagram illustrating a melt-in portion formed in a powder bed by a beam.

Subsequently, the three-dimensional additive manufacturing device 1 determines a cycle in which the presence of an internal defect 50 is determined on the basis of the emission condition set in step S202 (step S203). Here, FIG. 12 is a schematic diagram illustrating the melt-in portion 8a formed in the powder bed 8 by a beam. FIG. 12 illustrates a plurality of layers of powder bed 8 formed over a plurality of cycles and illustrates a state in which the melt-in portion 8a having a melt-in depth L is formed when a beam having a predetermined output level is radiated.

Here, the melt-in depth L of the melt-in portion 8a depends on an input heat amount H of a beam radiated to the powder bed 8. Particularly, the greater the input heat amount H of the beam, the larger becomes the melt-in depth L. When a beam having a large input heat amount H is radiated, the melt-in portion 8a is formed over a plurality of layers as illustrated in FIG. 12. In this case, an internal defect 50 is likely to occur in a lower layer side (in FIG. 12, a powder bed 8n-2 of an (n-2)th layer) than a powder bed 8n of the n-th layer laid in step S201. Therefore, in order to detect the internal defect 50 occurring on the lower layer side, it is necessary to detect and inspect the internal defect 50 in a cycle later than the cycle in which the powder bed 8n-2 where the internal defect 50 exists is formed.

In step S203, with attention to such properties of the internal defect 50, it is determined which cycle of the forming cycle performed repeatedly, the detection and inspection of the internal defect 50 is to be performed. Specifically, in the example of FIG. 12, since the internal defect 50 exists on the lower side by two layers than an uppermost layer of the powder bed 8, it is determined that inspection is to be performed two cycles later than the forming cycle of the powder bed 8.

In step S203, the relation between the input heat amount H of the beam and the melt-in depth L formed in the powder bed 8 may be defined in advance as a map, and the melt-in depth L may be estimated on the basis of the input heat amount H specified from the emission condition set in step S202.

Subsequently, the three-dimensional additive manufacturing device 1 progresses the forming cycle (step S204) and determines whether the forming cycle determined in step S203 has been reached (step S205). When the forming cycle determined in step S203 has been reached (step S205: YES), the measurement values obtained by the local temperature detection sensor 36 and the temperature-distribution detection sensor 46 are acquired while a laser beam being scanned and radiated by the beam emitting unit 14 (step S206) similarly to step S104 described above. Subsequently, the control device 100 determines the presence of an internal defect on the basis of the measurement values received in step S206 (step S207) similarly to step S105. In this way, since the presence of an internal defect can be determined at an appropriate timing according to the depth at which the internal defect 50 exists, it is possible to inspect an internal defect with higher accuracy.

As a result, when it is determined that an internal defect exists (step S207: YES), the warning notification part 108 warns the presence of an internal defect by activating the warning part 48 (step S210). In this way, a worker such as an operator can recognize the presence of an internal defect and an appropriate countermeasure can be taken such as suspending or stopping a subsequent forming work.

On the other hand, when it is determined that an internal defect does not exist (step S207: NO), it is determined whether a series of forming works have been completed (step S208). When the forming work is not completed (step S208: NO), the control device 100 returns to step S201 and a subsequent forming work is performed. In this manner, the control device 100 monitors the presence of an internal defect on a real-time basis while a forming work is being repeated and issues a warning when an internal defect is found. In this way, it is possible to obviate an unnecessary forming work.

After that, when the forming cycle is repeated sufficiently and the forming work is completed (step S208: YES), nondestructive inspection is performed on the obtained three-dimensional molded object as necessary (step S209). When it is confirmed by the nondestructive inspection that no defect exists in a final product, the series of forming works is completed (END).

As described above, according to this modification, since it is determined whether an internal defect exists after a predetermined number cycles from a cycle in which a beam is radiated according to an input heat amount of the beam, it is possible to perform inspection at an appropriate timing according to the depth at which an internal defect exists and to detect an internal defect with higher accuracy.

According to at least one embodiment of the present invention, it is possible to provide an internal defect detection system capable of detecting an internal defect on a real-time basis during a forming work and to provide a three-dimensional additive manufacturing device including the same and an internal defect detection method.

INDUSTRIAL APPLICABILITY

At least one embodiment of the present invention can be applied to an internal defect detection system of a three-dimensional additive manufacturing device which radiates a beam to laid powder to selectively harden the powder and performs additive molding, a three-dimensional additive manufacturing device including the system, and an internal defect detection method performed by the system.

REFERENCE SIGNS LIST

1 Three-dimensional additive manufacturing device
  2 Base plate
  4 Cylinder
  8 Powder bed
  8a Melt-in portion
  10 Powder laying unit
  14 Beam emitting unit
  36 Local temperature detection sensor
  46 Temperature-distribution detection sensor
  48 Warning part
  100 Control device
  102 Candidate-position specification part
  104 Cooling-speed calculation part
  106 Defect determination part
  108 Warning part

The invention claimed is:

1. An internal defect detection system for a three-dimensional additive manufacturing device which performs additive molding by emitting a beam to a powder bed, the internal defect detection system comprising:
  a local-temperature detection sensor configured to measure a local temperature of an irradiated part of the powder bed irradiated by the beam;
  a temperature-distribution detection sensor configured to detect a temperature distribution of a detection-target area on the powder bed, the detection-target area including the irradiated part; and
  a computer configured to execute a program and control the internal defect detection system to operate as:
  a candidate-position specification part configured to specify a candidate position of an internal defect inside the detection-target area on the basis of a change amount of the local temperature detected by the local-temperature detection sensor with respect to a position within a surface of the powder bed,
  a cooling-speed calculation part configured to calculate a cooling speed at the candidate position by continuously acquiring the temperature distribution detected over time by the temperature-distribution detection sensor, and
  a defect determination part configured to determine whether the internal defect exists at the candidate position on the basis of the cooling speed at the candidate position,
  wherein a result of a determination of the existence of the internal defect by the defect determination part is used to automatically prompt predetermined corrective actions to be taken with respect to the detected internal defect.

2. The internal defect detection system for a three-dimensional additive manufacturing device according to claim 1, wherein the candidate-position specification part is configured to specify a position where the change amount is greater than a surrounding part as the candidate position.

3. The internal defect detection system for a three-dimensional additive manufacturing device according to claim 2, wherein the local-temperature detection sensor includes a radiation thermometer configured to measure the local temperature of the irradiated part of the beam on the basis of a strength of electromagnetic waves derived from the irradiated part through a light axis of the beam.

4. The internal defect detection system for a three-dimensional additive manufacturing device according to claim 2, wherein the candidate-position specification part is configured to specify the candidate position on the basis of a result excluding a change amount based on an output change of the beam from the change amount.

5. The internal defect detection system for a three-dimensional additive manufacturing device according to claim 1, further comprising an audio or a visual indicator that provides a warning of the internal defect if the defect determination part determines that the internal defect exists.

6. The internal defect detection system for a three-dimensional additive manufacturing device according to claim 1, wherein the defect determination part is configured to determine whether the internal defect exists, a predetermined number of cycles after a cycle in which the beam is emitted, based on an input heat amount of the beam.

* * * * *